US007389935B2

(12) United States Patent
Smith et al.

(10) Patent No.: US 7,389,935 B2
(45) **Date of Patent: *Jun. 24, 2008**

(54) CARD STRIPPER FOR REMOVING CARDS FROM CARD CARRIERS

(75) Inventors: Scott J. Smith, Omaha, NE (US); Corey D. Tunink, LaVista, NE (US); Timothy J. Walpus, Omaha, NE (US); Jeffery G. Nowlin, Council Bluffs, IA (US); Jay E. Greene, Omaha, NE (US)

(73) Assignee: First Data Corporation, Englewood, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 11/733,468

(22) Filed: Apr. 10, 2007

(65) Prior Publication Data

US 2007/0175991 A1 Aug. 2, 2007

Related U.S. Application Data

(63) Continuation of application No. 10/853,777, filed on May 24, 2004, now Pat. No. 7,225,990, which is a continuation-in-part of application No. 10/222,132, filed on Aug. 16, 2002, now Pat. No. 6,763,997, and a continuation-in-part of application No. 10/072,379, filed on Feb. 5, 2002, now Pat. No. 6,758,392.

(51) Int. Cl.

| | |
|---|---|
| ***G06K 13/06*** | (2006.01) |
| ***G06K 13/24*** | (2006.01) |
| ***G06K 13/063*** | (2006.01) |
| ***G06K 13/067*** | (2006.01) |
| ***G06K 5/00*** | (2006.01) |

(52) U.S. Cl. ........................ 235/479; 235/483; 235/380; 235/485; 209/2; 209/618

(58) Field of Classification Search ................. 235/483, 235/485, 475, 476, 479; 902/25, 29, 37, 902/41; 209/608, 617, 618, 631, 633, 638, 209/656, 900, 3.1, 547

See application file for complete search history.

(56) References Cited

U.S. PATENT DOCUMENTS 3,212,199 A * 10/1965 Clark ......................... 434/335

(Continued)

FOREIGN PATENT DOCUMENTS

| | | | |
|---|---|---|---|
| JP | 8-133512 A | * | 5/1996 |
| JP | 10057601 A | | 3/1998 |
| JP | 2001148070 A | | 5/2001 |

OTHER PUBLICATIONS

Internet, SEM Commercial Application Products Page, Security Engineered Machinery; Credit Card/I.D. Badge Destruction, www/semshred.com, 1 page, Apr. 5, 2002.

(Continued)

*Primary Examiner*—Jared J Fureman
(74) *Attorney, Agent, or Firm*—Townsend and Townsend and Crew LLP

(57) ABSTRACT

An automated system for preparing cards for further processing includes an envelope feed hopper configured to receive a plurality of envelopes, each having contents including a card carrier and one or more cards attached thereto. The systems also includes an envelope opener configured to receive envelopes from the hopper and create an opening into each envelope. The system further includes a contents parser configured to separate a card carrier and card attached thereto from an envelope. The system also includes a card carrier alignment device configured to unfold a card carrier and align the carrier for further processing and a separation mechanism configured to receive card carriers from the alignment device and separate the card from the carrier. The system also includes a controller programmed to control operation of the system.

8 Claims, 15 Drawing Sheets

U.S. PATENT DOCUMENTS

| | | | | | |
|---|---|---|---|---|---|
| 3,804,226 | A * | 4/1974 | Ellis | 400/531 |
| 4,194,685 | A * | 3/1980 | Hill et al. | 235/375 |
| 4,447,715 | A | 5/1984 | Vulcano | |
| 4,828,188 | A | 5/1989 | Snyder | |
| 4,864,114 | A | 9/1989 | Eriane et al. | |
| 4,865,477 | A * | 9/1989 | George | 209/656 |
| 5,441,159 | A * | 8/1995 | DeWitt et al. | 209/3.1 |
| 6,445,808 | B1 * | 9/2002 | Lile et al. | 209/3.1 |
| 6,547,078 | B1 * | 4/2003 | Lile et al. | 209/900 |
| 6,550,701 | B1 | 4/2003 | Chang | |
| 6,758,392 | B2 | 7/2004 | Bennett et al. | |
| 6,763,997 | B2 | 7/2004 | Bennett et al. | |
| 7,225,990 | B2 * | 6/2007 | Smith et al. | 235/483 |
| 2004/0084518 | A1 * | 5/2004 | Bretl et al. | 235/375 |
| 2004/0089706 | A1 * | 5/2004 | Hill et al. | 235/375 |
| 2005/0082363 | A1 * | 4/2005 | Eichler et al. | 235/380 |

OTHER PUBLICATIONS

Internet, Security Engineered Machinery Product Comparisons Page, Security Engineered Machinery, CreditCard Destruction Systems, www.semshred.com, 2 pages, Apr. 5, 2002.

* cited by examiner

CARD STRIPPER FOR REMOVING CARDS FROM CARD CARRIERS

CROSS-REFERENCES TO RELATED APPLICATIONS

This application is a continuation and claims the benefit of, commonly assigned U.S. patent application Ser. No. 10/853,777, entitled "Card Stripper For Removing Cards From Card Carriers," filed on May 24, 2004, now U.S. Pat. No. 7,225,990, which is a continuation-in-part and claims the benefit of, commonly assigned U.S. patent application Ser. No. 10/072,379, entitled "Card Destruction Systems And Methods," filed on Feb. 5, 2002, now U.S. Pat. No. 6,758,392, and is a continuation-in-part and claims the benefit of, commonly assigned U.S. patent application Ser. No. 10/222,132, entitled "Documented Item Destruction Systems And Methods," filed on Aug. 16, 2002, now U.S. Pat. No. 6,763,997, the entire disclosure of each of which are herein incorporated by reference for all purposes.

BACKGROUND OF THE INVENTION

This invention relates generally to the field of card destruction. More specifically, the invention relates to automated systems and methods for preparing cards for destruction.

A variety of organizations issue cards to their customers. For example, such organizations may issue credit cards, debit cards, smart cards, loyalty cards and the like to their customers. Often, such organizations contract with another company to produce and mail such cards to the end consumer. For a variety of reasons, once produced some of the cards may need to be destroyed. For instance, some cards may be returned by the postal service as being undeliverable, the customer's account may be closed, or the like.

While such cards can be manually destroyed, such a process is time intensive and can make it difficult to produce reliable records of the destruction. Hence, this invention relates to systems and techniques to facilitate card destruction in a more efficient and reliable manner.

BRIEF SUMMARY OF THE INVENTION

Embodiments of the invention thus provide an automated system for preparing cards for further processing. The system includes an envelope feed hopper configured to receive a plurality of envelopes, each having contents including a card carrier and one or more cards attached thereto. The systems also includes an envelope opener configured to receive envelopes from the hopper and create an opening into each envelope. The system further includes a contents parser configured to separate a card carrier and card attached thereto from an envelope. The system also includes a card carrier alignment device configured to unfold a card carrier and align the carrier for further processing and a separation mechanism configured to receive card carriers from the alignment device and separate the card from the carrier. The system also includes a controller programmed to control operation of the system.

In some embodiments, the system also includes a card destruction device configured to receive cards from the separation mechanism and destroy the cards. The card separation mechanism may include a pair of rollers and a separation guide. The rollers are configured for rotation in opposite directions and define a receiving slot configured to receive a card carrier having a card attached thereto. The rollers may be configured to advance the card carrier and card toward the separation guide. The separation guide may be a wedge that is configured to penetrate a space between the card and the carrier and cause the card to move in a direction away from the carrier as the rollers advance the card and carrier toward the separation guide. One roller may be configured for adjustment with respect to the other roller in at least two directions. The card separation mechanism also may include a tensioning arrangement configured to allow one roller to move with respect to the other while maintaining generally constant pressure between the two. The tensioning arrangement may be a spring.

In other embodiments, present invention provides an automated system for preparing cards for further processing. The system includes means for separating a card carrier and attached cards from an envelope and orienting the carrier for further processing, a card separation mechanism that separates at least one card from the carrier and positions the card for further processing, and a controller that controls the operation of the automated system. The system may include means for receiving a plurality of envelopes, each having contents including a card carrier and one or more cards attached thereto. The contents also may include inserts in which case the means for separating a card carrier and attached cards from an envelope may include means for separating a card carrier and attached cards from the inserts. The card may be a credit card, debit card, phone card, smart card, loyalty card, presentation instrument, or the like. The system also may include a card destroyer. In some embodiments, the card separation mechanism includes a pair of rollers and a separation guide. The rollers may be configured for rotation in opposite directions and define a receiving slot configured to receive a card carrier having a card attached thereto. The rollers may be configured to advance the card carrier and card toward the separation guide. The separation guide may be a wedge that is configured to penetrate a space between the card and the carrier and cause the card to move in a direction away from the carrier as the rollers advance the card and carrier toward the separation guide. One roller may be configured for adjustment with respect to the other roller in at least two directions. The card separation mechanism may include a tensioning arrangement configured to allow one roller to move with respect to the other while maintaining generally constant pressure between the two. The tensioning arrangement may be a spring. The controller may be a programmable logic controller.

In other embodiments, the present invention provides a card separation mechanism that includes a pair of rollers and a separation guide. The rollers may be configured for rotation in opposite directions and define a receiving slot configured to receive a card carrier having a card attached thereto. The rollers may be configured to advance the card carrier and card toward the separation guide. The separation guide may be a wedge that is configured to penetrate a space between the card and the carrier and cause the card to move in a direction away from the carrier as the rollers advance the card and carrier toward the separation guide. One roller may be configured for adjustment with respect to the other roller in at least two directions. The card separation mechanism may include a tensioning arrangement configured to allow one roller to move with respect to the other while maintaining generally constant pressure between the two. The tensioning arrangement may be a spring.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

The invention provides systems and methods for preparing cards, or presentation instruments, for destruction. Cards may include, for example, credit cards, debit cards, phone cards, smart cards, loyalty cards, and the like. Such cards are typically constructed of a plastic material and may be destroyed by shredding devices, cutting devices and the like. However, it will be appreciated that the invention is not intended to be limited to a specific card type or destruction device.

The systems and methods are automated so that an operator may simply place items to be destroyed into the system and actuate the system. The system automatically removes cards from envelopes, separates them from carriers, and prepares them for destruction. The envelopes may include inserts, such as statements, advertising, offers, and the like. The cards may be attached to carriers, and the attachment means may include D-holes, glue, slots, and the like. While the system is described with respect to destroying cards, it should be appreciated that the system also includes staging cards for other follow-on processing, such as redirected mailing, reprogramming, and the like.

Figure 1A:
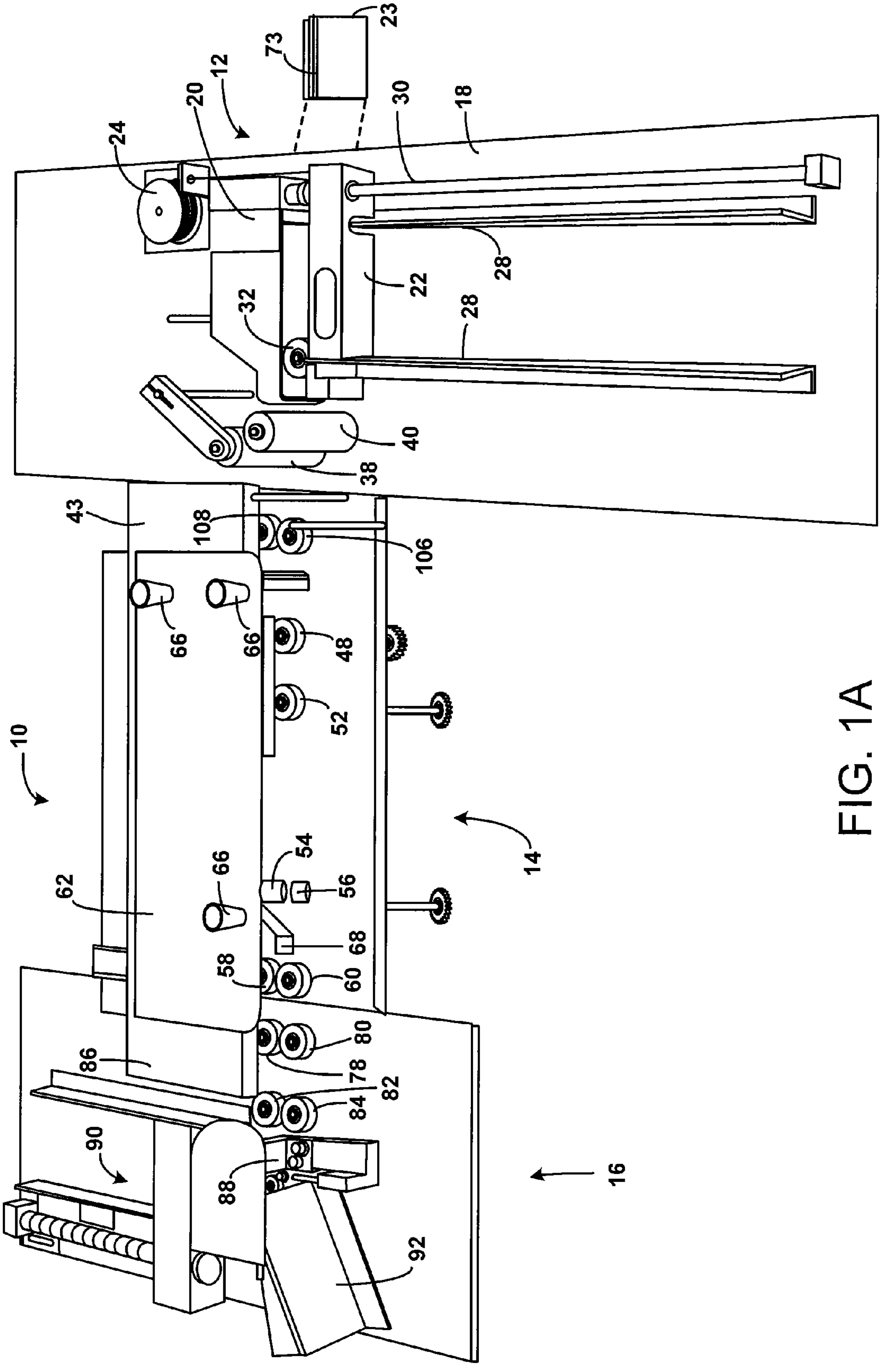
FIG. 1A is a front perspective view of one embodiment of a card destruction system according to the invention.
Figure 2A:
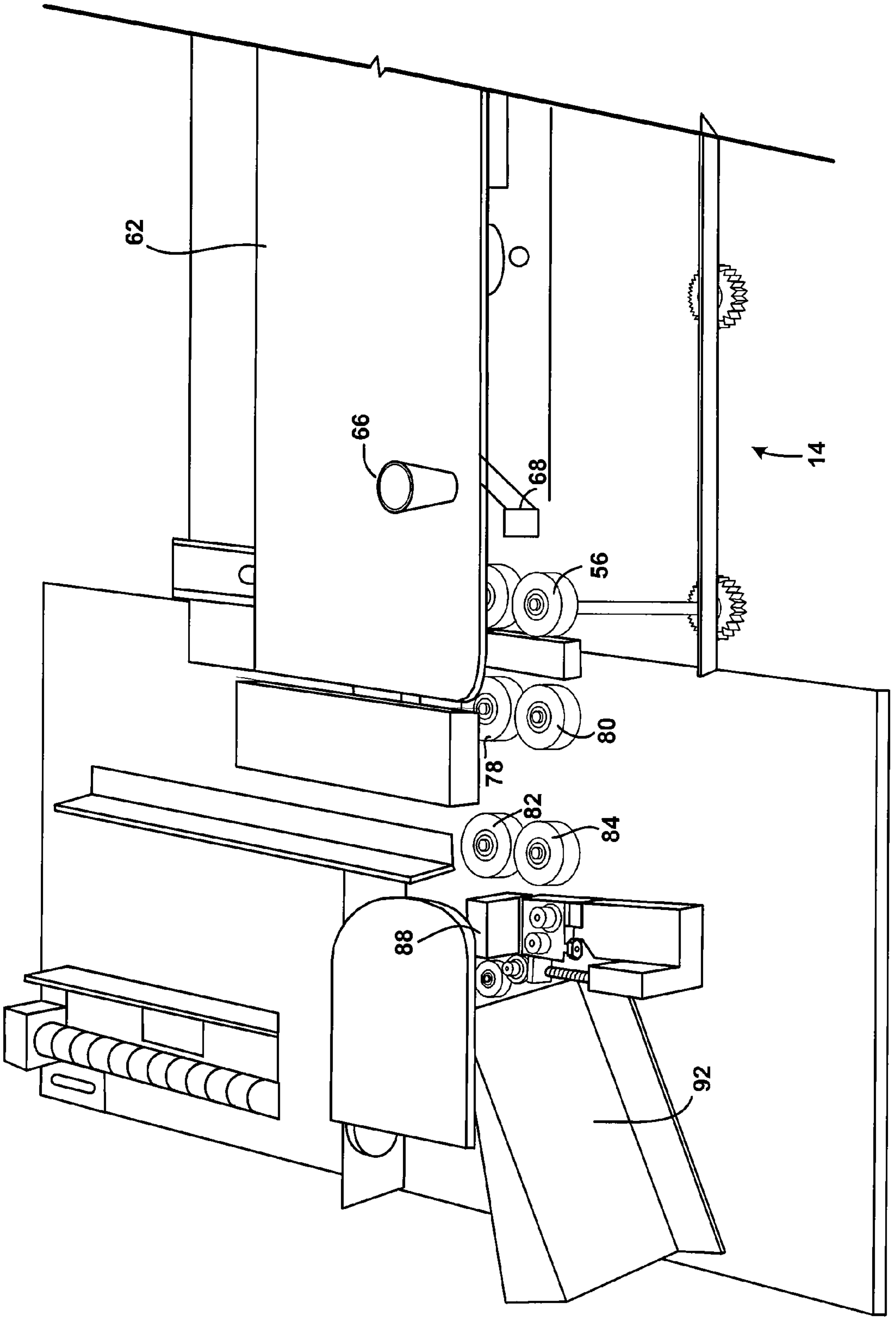
FIG. 2A is a more detailed view of a left-hand side of the card destruction system of FIG. 1.
Figure 2B:
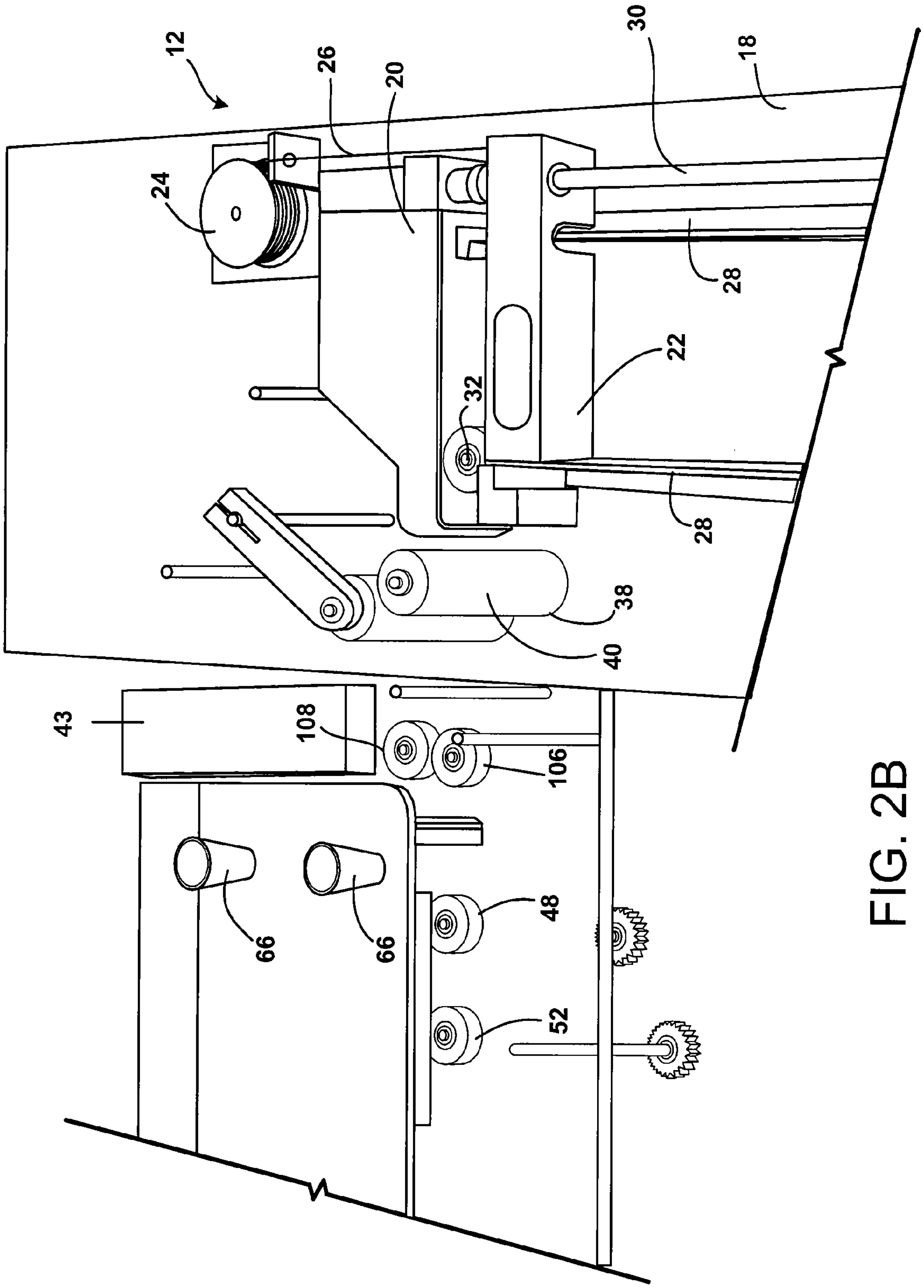
FIG. 2B is a more detailed view of a right-hand side of the card destruction system of FIG. 1.

Referring now to FIGS. 1A, 2A and 2B, one embodiment of a card destruction system 10 will be described. System 10 may conveniently be defined in terms of a card feeding portion 12, a card reading portion 14, and a card disposition portion 16. As best shown in FIGS. 1A and 2B, card feeding portion 12 rests on a base 18 and comprises a holder 20 onto which a stack of cards may be placed. Spaced apart from holder 20 is a biasing plate 22 that is biased toward holder 20 by a spring-loaded spool 24 having a length of wire 26 that is coupled to plate 22. In this way, the stack of cards is held between holder 20 and plate 22. As individual cards are removed from the stack, plate 22 moves closer to holder 20 to firmly hold the stack of cards against holder 20. Conveniently, card feeding portion 12 includes a pair of rails 28 between which the stack of cards are placed, and a rod 30 that acts as a guide or track for plate 22 as it moves toward and away from holder 20.

When a stack of cards is placed onto holder 20, the bottom card rests on a roller 32 having a cam (hidden from view). Roller 32 is rotated by a solenoid 34 (see FIG. 5A) to cause the cam to engage the bottom card of the stack. In so doing, the bottom card bends sufficiently to permit the cam to move past the bottom card. After the cam passes the card, the card springs away from the stack and is moved by another roller 36 (see FIG. 3A) which moves the card to another pair of rollers 38 and 40 which move the card to card reading portion 14. Hence, card feeding portion 12 is configured to separately introduce individual cards to card reading portion 14. As described in greater detail hereinafter with reference to FIG. 7A, a controller 42 is employed to operate solenoid 34 to control the feeding of cards to card reading portion 14. A presence sensor 43 is employed to sense when a card has exited card feeding portion 12 and entered into card reading portion 14. Controller 42 may utilize the information from sensor 43 to re-actuate roller 32 in case a card was inadvertently not removed from the stack.

Figure 3A:
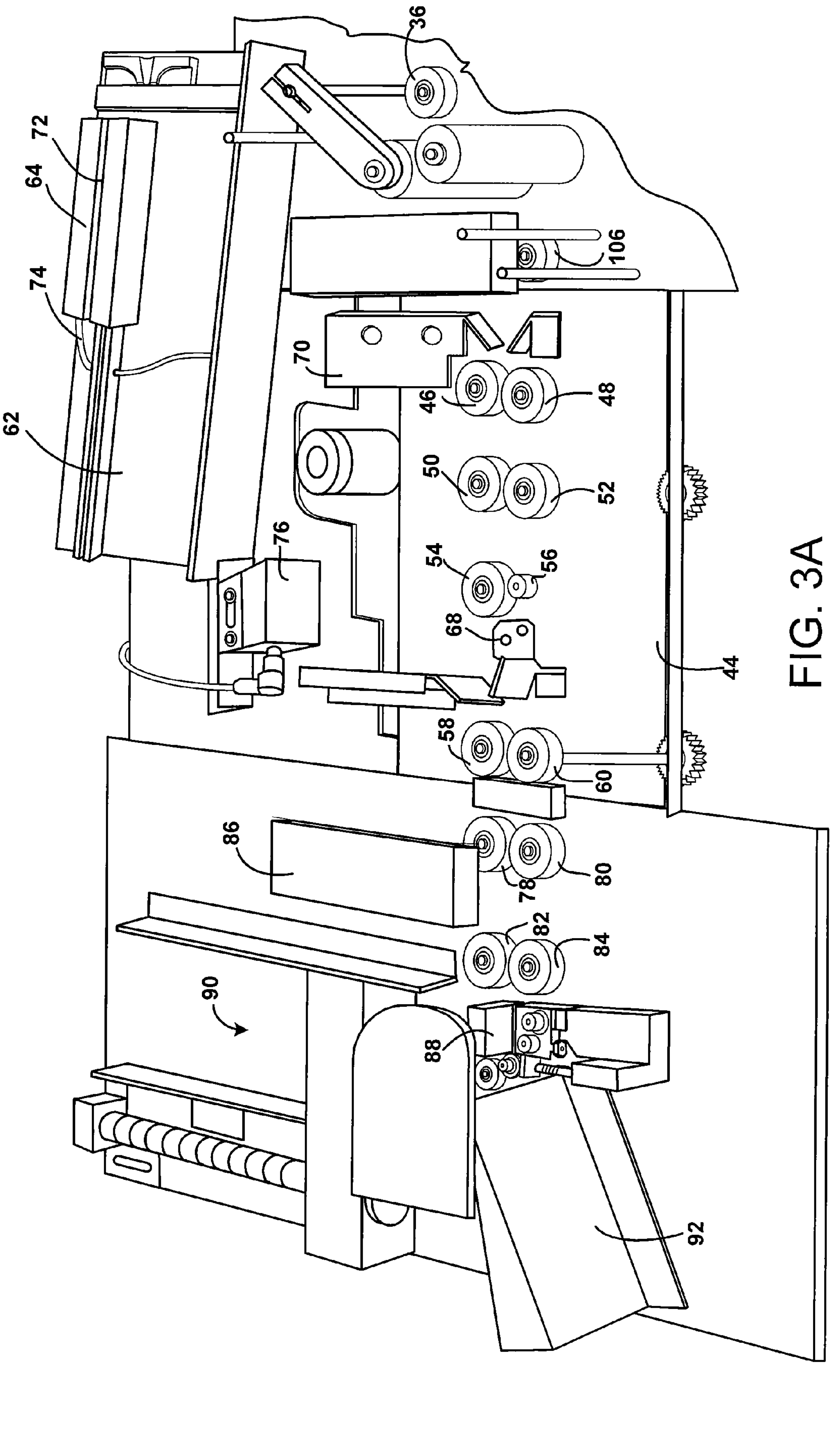
FIG. 3A illustrates a card reader portion of the card destruction system of FIG. 1A with a card reader being disassembled.
Figure 4:
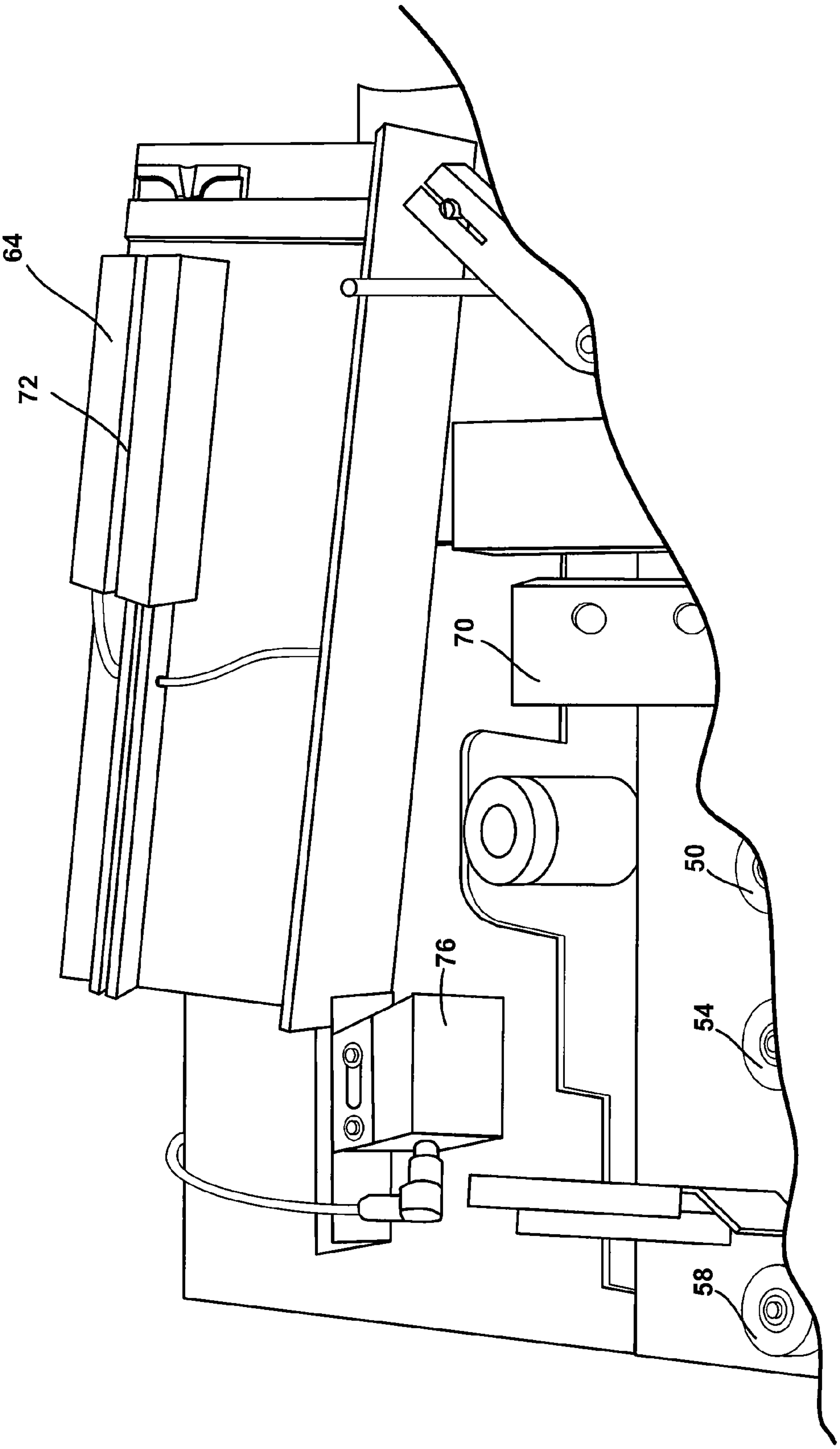
FIG. 4 is a more detailed view of the card reader of FIG. 3A.

Referring also now to FIG. 3A, card reading portion 14 will be described in greater detail. Card reading portion 14 also includes a base 44 along which are disposed various sets of rollers 46, 48, 50, 52, 54, 56, 58 and 60. Rollers 46-60 are arranged in pairs which rotate in opposite directions to move the card in an upright or vertical orientation along base 44. Coupled to base 44 is a lid 62 that includes a card reader 64 which is shown in greater detail in FIG. 4. Conveniently, a set of screws 66 may be used to couple lid 62 to base 44. Various brackets 68 and 70 may be coupled to base 44 to provide openings where screws 66 pass to securely couple reader 64 to base 44.

As the card is moved through card reading portion 14, it passes through a slot 72 in card reader 64. In this way, the information stored on the magnetic stripe of the card is read and passed to controller 42 (see FIG. 7A) via an electrical cable 74 (see FIG. 3A). Although shown with a card reader that is configured to read magnetic stripes from cards, it will be appreciated that other types of readers may be used, such as, for example, readers for reading smart chips. Cable 74 is employed to transmit the information to controller 42. As described in greater detail hereinafter, this information is used to determine whether or not the card is to be destroyed. A presence sensor 76 is employed to sense the presence of the card after it passes through reader 64. As described hereinafter, sensor 76 may send a signal to controller 42 to indicate the presence of the card at the end of card reading portion 14. In this way, if the controller has not yet determined whether or not the card should be destroyed, the controller may stop operation of rollers 58 and 60 so that the card does not continue to card disposition portion 16.

Card disposition portion 16 includes pairs of rollers 78, 80, 82 and 84 that rotate in opposite directions similar to the other rollers described to continue movement of the card through card disposition portion 16. Another sensor 86 is employed to sense once the card enters into card disposition portion 16.

Figure 5A:
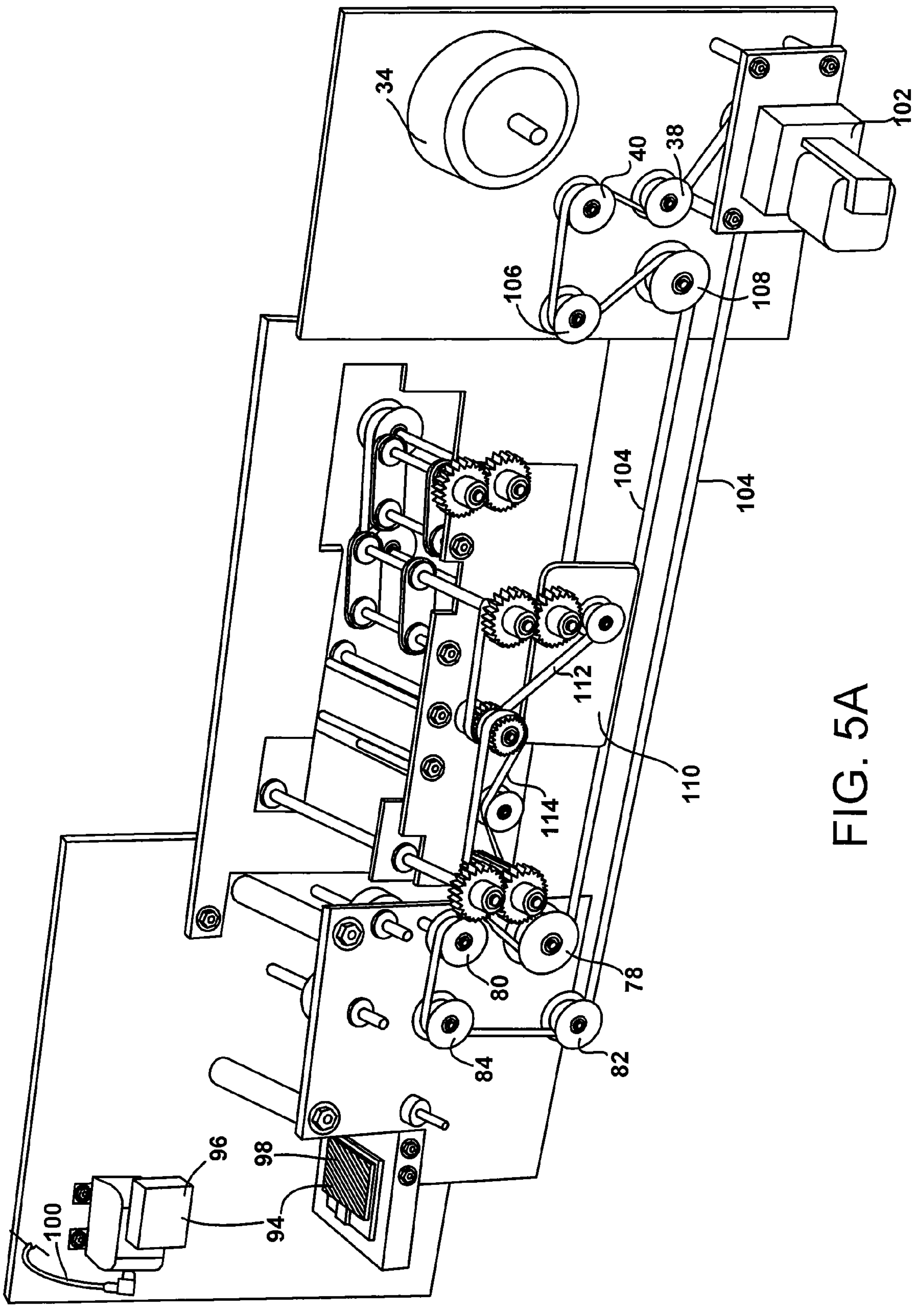
FIG. 5A is a bottom perspective view of the card destruction system of FIG. 1A.
Figure 6:
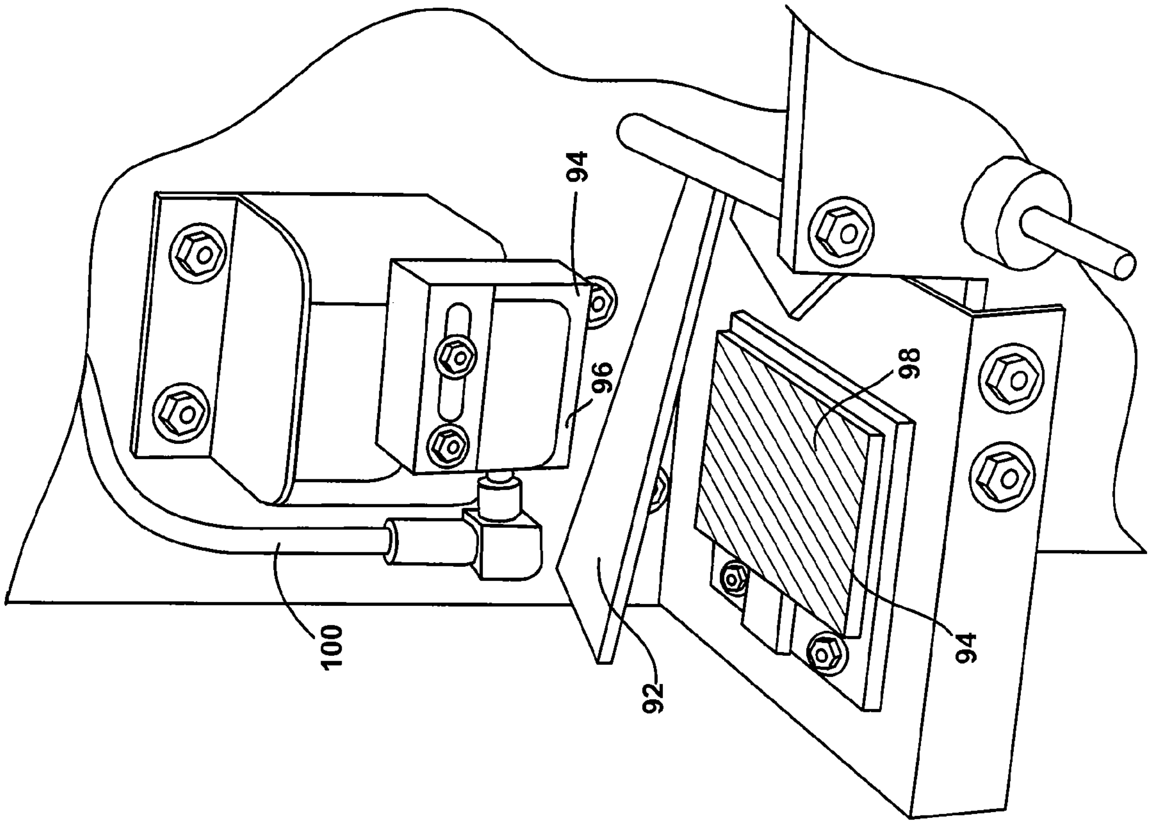
FIG. 6 is a detailed view of a sensor employed to sense when a card has been destroyed.

Rollers 82 and 84 move the card toward a flipper 88 that pivots back and forth to direct the card either toward a card destruction device or into a holding bin 90 depending on whether or not the card is to be destroyed. Flipper 88 is moved based on operational signals from the controller. If the card is to be destroyed, it is directed by flipper 88 into a chute 92 where it falls through the air into a card destruction device, such as a shredder (not shown). As best shown in FIGS. 5A and 6, a phase shift sensor system 94 is disposed to detect when the card falls through the air and into the card destruction device. Sensor system 94 is constructed of a light source 96 and a phase shift reflector 98. An electrical cable 100 is employed to send the sensed signal back to the controller where a record of the card destruction may be recorded.

Referring now to FIG. 5A, a bottom view of system 10 is shown. System 10 further includes an AC motor 102 that is coupled to a belt 104 that in turn is used to rotate various rollers of system 10. Motor 102 may be configured to continuously operate so that the rollers in contact with belt 104 continually rotate. More specifically, motor 102 is employed to continuously rotate rollers 38, 40, 78, 80, 82, 84 as well as rollers 106 and 108 in card feeding portion 12. One or more DC motors 110 are employed to rotate belts 112 and 114 to rotate the rollers within card reading portion 14. By utilizing a DC motor, the rollers within card reading portion 14 may easily be stopped, such as when needed if information regarding whether the card is to be destroyed or not has not yet been received back from the controller.

Figure 7A:
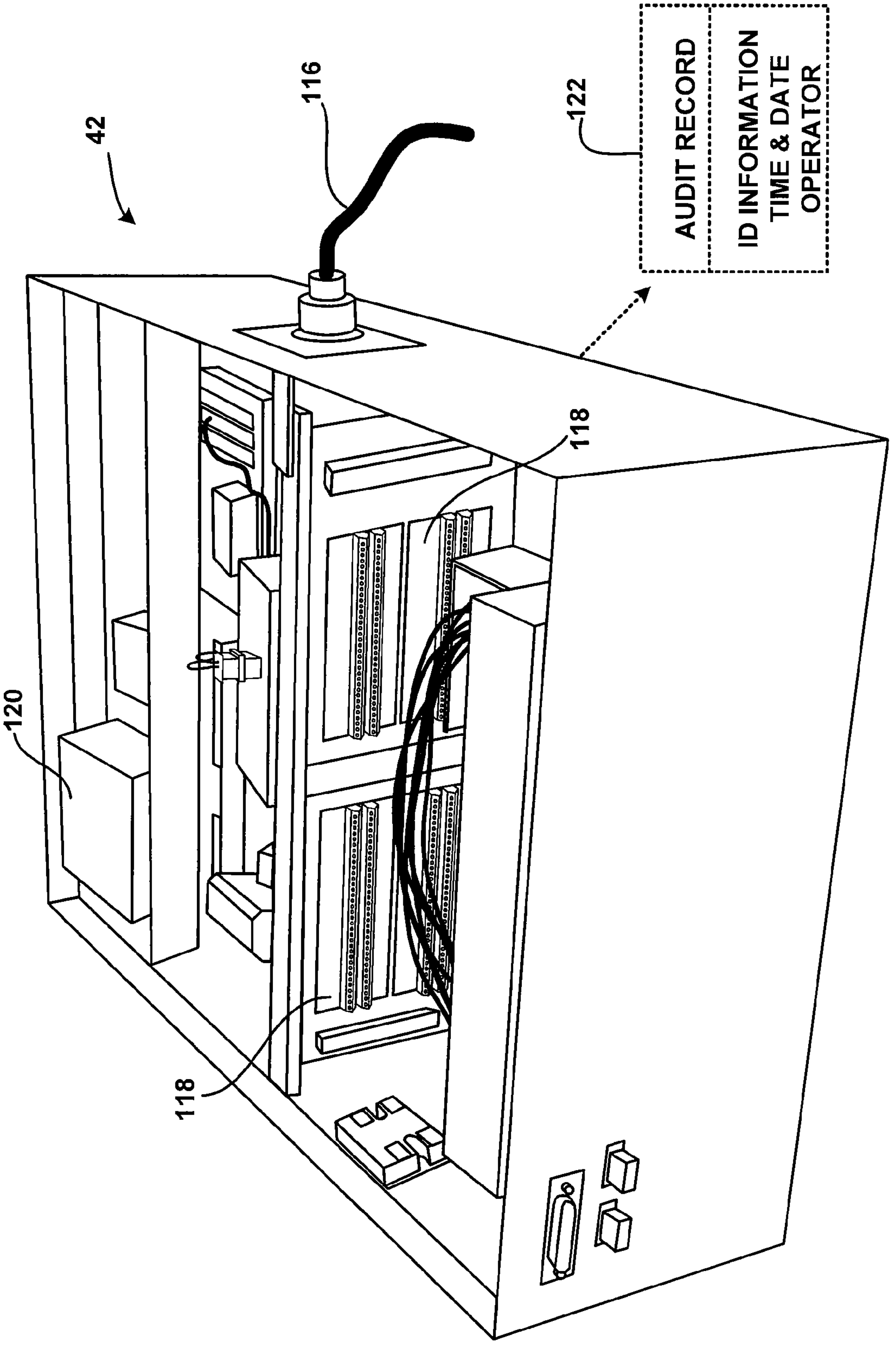
FIG. 7A is a perspective view of a controller employed to control the card destruction system of FIG. 1A.

Referring now to FIG. 7A, construction of controller 42 will be described in greater detail. Controller 42 includes cabling 116 to permit communication with the various sensors, readers, motors, and the like as previously described. Controller 42 may also include one or more boards 118 to control the operation of various components of system 10. A power supply 120 is also provided to supply power to controller 42.

Figure 1B:
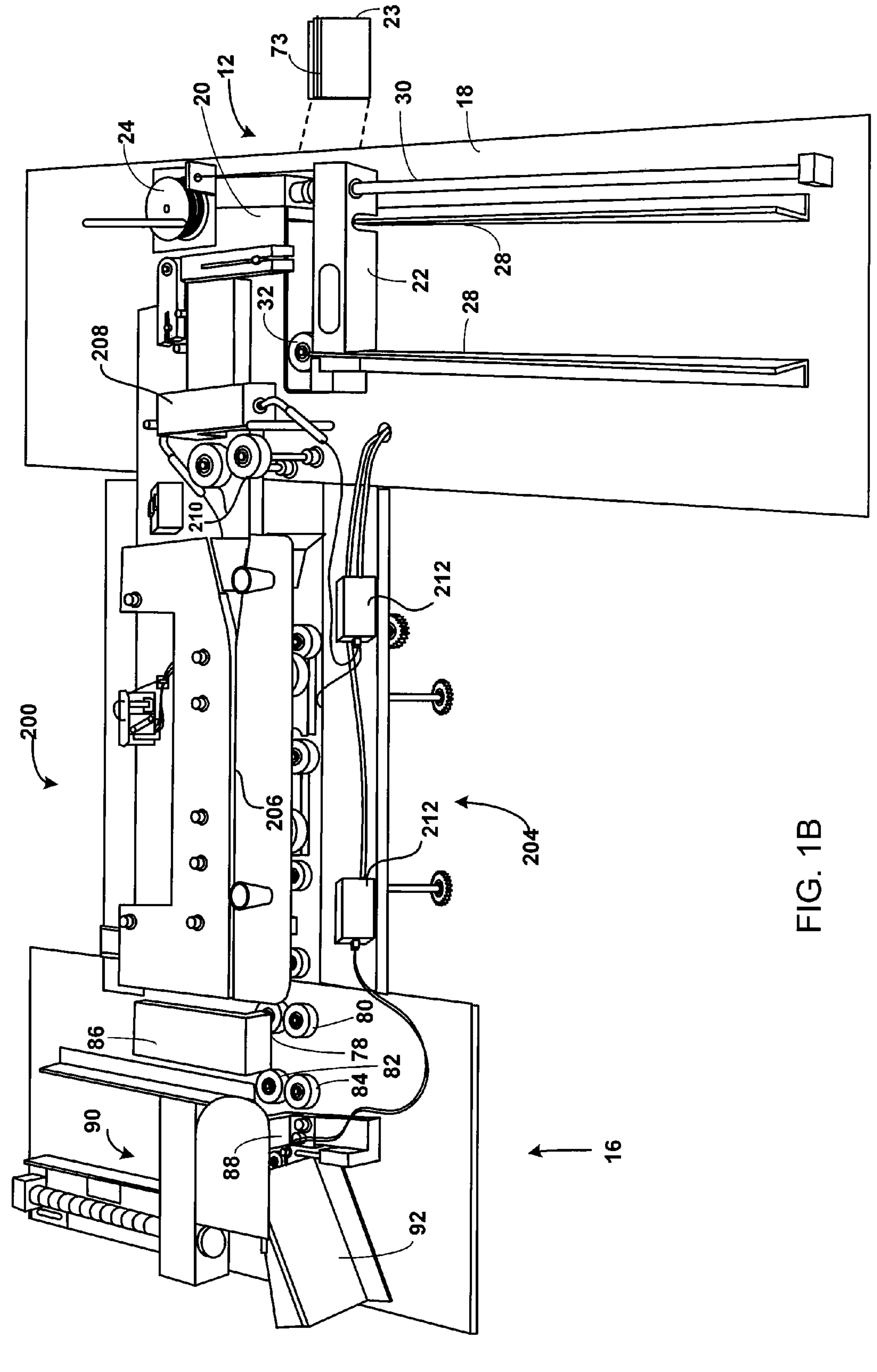
FIG. 1B is a front perspective view of an alternative embodiment of a card destruction system according to the invention.

Attention is directed to FIGS. 1B, 3B, 5B, and 7B, which illustrate an alternative version of a card destruction system 200. The card destruction system 200 includes many of the same components as the card destruction system 10. The card reading and controller portions, however, have noteworthy differences. FIG. 1B illustrates an overall view of the alternative card destruction system 200. In contrast to the previously-described embodiment, the card reading portion 204 includes an externally-accessible slot 206 through which the cards travel. The feeding portion 12 operates in substantially the same manner. At an appropriate time (e.g., when a previous card has been processed), the controller activates the roller 32 to advance the next card. The presence of the card is sensed by the sensor 208, which may be a thru-beam sensor, a reflective sensor, or the like. A pair of rollers 210, then advance the card to the slot 206. As will be explained more fully immediately hereinafter, the card is moved through the slot by a belt and is read by two readers. The sensor 86 senses the presence of the card at the end of the slot, which results in the controller stopping the advancement of the card pending disposition. The card is then either dispositioned to the slot 92 for destruction or to the holding bin 90 for further processing. If the card is to be destroyed, a sensor (not shown), which also may be a thru-beam sensor, a phase shift sensor, a reflective sensor, or the like, confirms the card entered a shredder or other destruction device. Sensor modules 212 transmit the sensor signals to a controller.

Figure 3B:
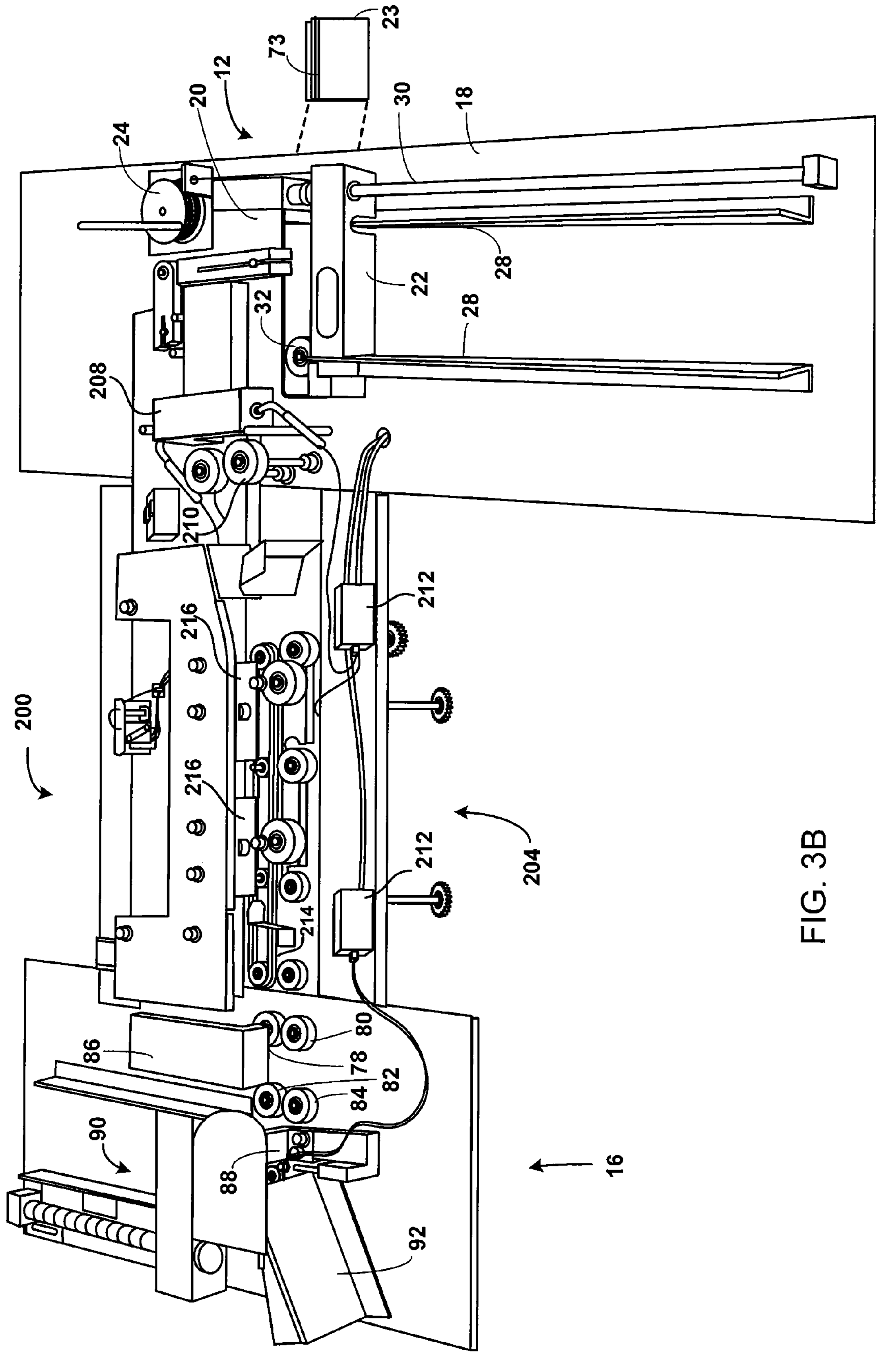
FIG. 3B illustrates the card destruction system of FIG. 1B with the card reader portion being disassembled.
Figure 5B:
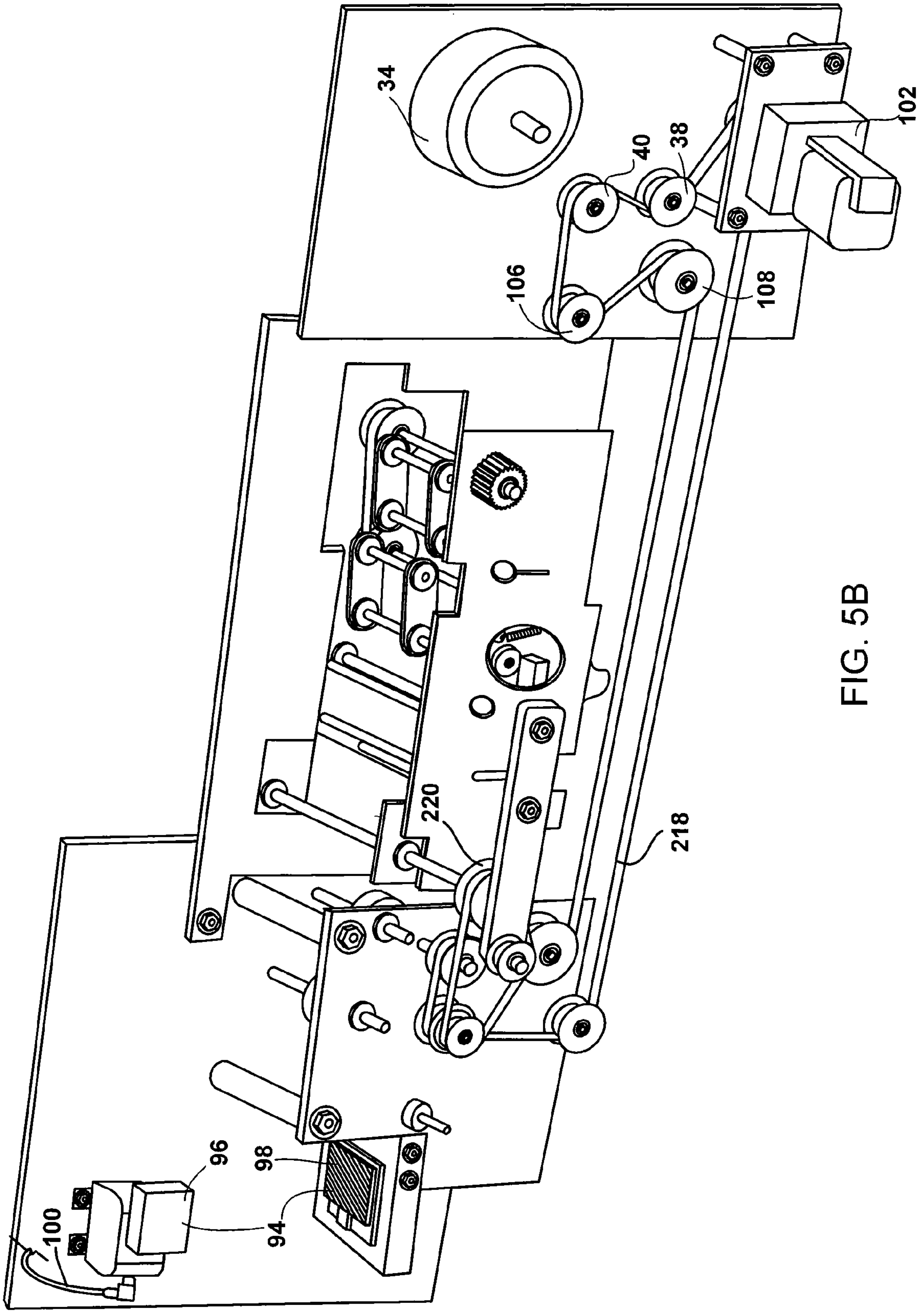
FIG. 5B is a bottom perspective view of the card destruction system of FIG. 1B.

Having described the alternative card destruction system 200 generally, attention is directed to FIG. 3B, which illustrates some components of the system in greater detail. In this figure, a cover plate has been removed, thus exposing the drive mechanism of the reader portion 204. As previously described, cards are advanced through the reading portion 204 by a belt 214. As the cards travel through the slot, each card is read by two readers 216. The readers may be magnetic stripe readers such as those manufactured by Magtek of Carson, Calif. Other types of readers may include bar code readers, smart card readers and the like. As shown in FIG. 5B, the belt is driven by a lower drive belt 218 via a drive wheel 220. This arrangement, as compared to the previously-described embodiment, eliminates one of the drive motors.

Figure 7B:
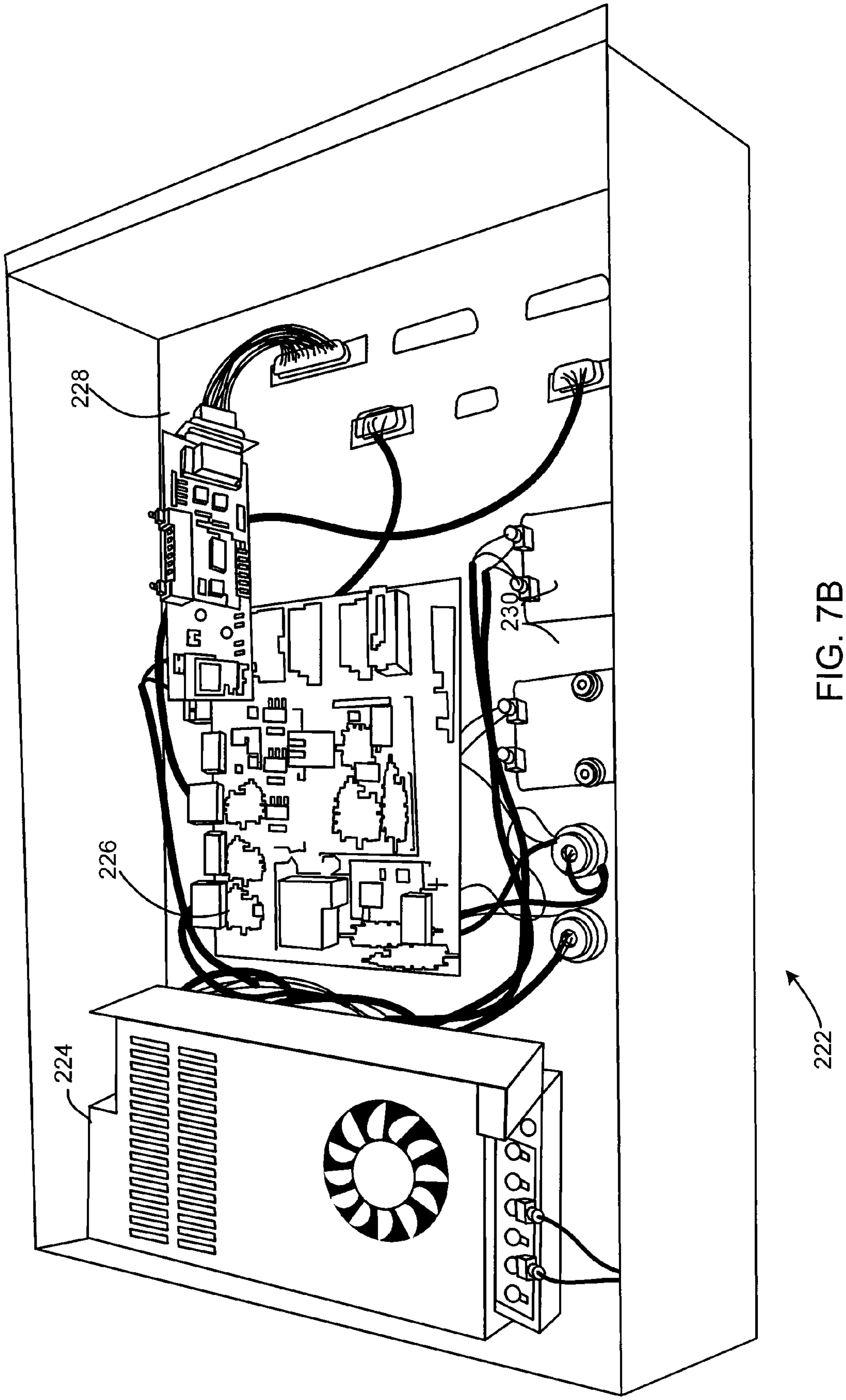
FIG. 7B is a perspective view of a controller employed to control the card destruction system of FIG. 1B.

The controller portion 222 is illustrated in FIG. 7B. It includes a power supply 224, a serial board 226, and a FPGA (Field Programmable Gate Array) controlled input board 228, and a pair of relays 230. The serial board 226 includes a processor and provides some high voltage outputs for operating the system. The FPGA controlled input board 228 receives signals from the various sensors and forwards them to the serial board 226. The relays 230 operate the motor and shredder.

Having described an alternative embodiment, operation of the previously-described embodiment follows. Those skilled in the art will appreciate how operation of the alternative embodiment operates in light of this description. A stack of cards is placed into card feeding portion 12 by distancing plate 22 from holder 20. System 10 is then actuated by use of controller 42 which begins operation of AC motor 102 and DC motor 110. Further, the controller causes roller 32 to rotate to dispense a card from the stack where it is grabbed by the various rollers and moved to card reading portion 14. In so doing, sensor 43 detects whether a card has been removed from the stack and advanced to card reading portion 14. If not, controller 42 re-actuates roller 32 to supply another card from the stack. As the card passes through reader 64, information is read from the card and passed to the controller 42. Controller 42 then accesses a database (which may be a remote computer) to determine whether or not the card has in fact been flagged for destruction. If the card reaches sensor 86 before this determination is made, controller 42 stops operation of DC motor 110 to maintain the card within card reading portion 14. Once a decision as to whether the card is to be destroyed or not is made, the card is permitted to pass to card disposition portion 16 where controller 42 controls operation of flipper 88 to direct the card either into holding bin 90 or into chute 92. The cards within bin 90 are those which are not to be destroyed and are permitted to be collected. On the other hand, if the card passes into chute 92 it falls through the air into a card destruction device. As it falls through the air, sensor system 94 senses the presence of the card and sends a signal to controller 42 where a record is made of the destruction. In this way, an audit record is produced to show that the card was actually destroyed. Further, the controller may have an input device where information on the operator is entered so that the record will also have information on the operator running system 10 when the card was destroyed. Controller 42 may also include a timer to record the date and time of the card destruction.

Sensor 86 may also be used to send a signal to the controller to indicate that system 10 is ready to receive another card from the stack. As such, the controller sends another signal to roller 32 to place another card into the system. In this way, the cards are automatically fed from the stack through the reader and to the card destruction device if the cards are to be destroyed. At the same time, a record is automatically created and stored showing the actual destruction of the card.

Figure 8A:
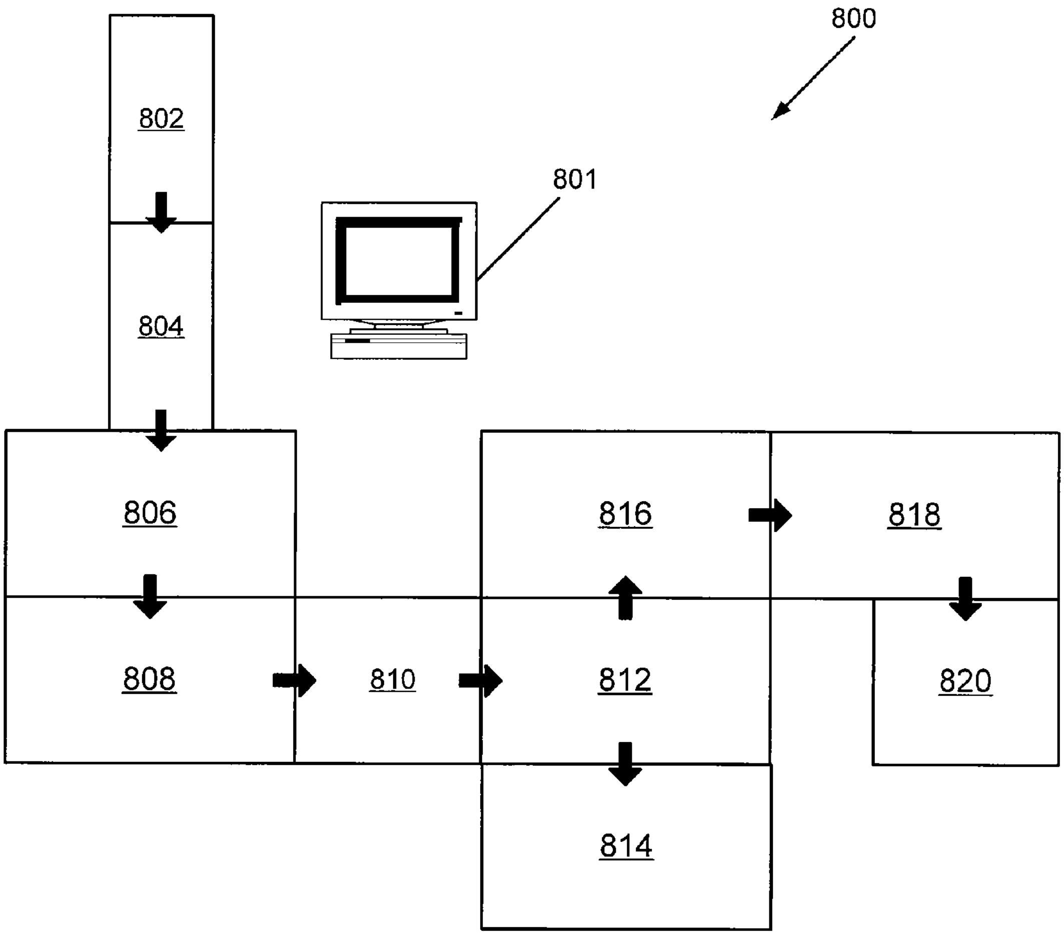
FIG. 8A is a schematic of system for preparing cards for destruction according to embodiments of the invention.

Having described a card destruction device, attention is directed to FIG. 8, which illustrates an exemplary system 800, for preparing cards for destruction according to embodiments of the invention. The system 800 incorporates devices and processes for removing cards from envelopes, carries and inserts before destruction. The process may be under the control of a computing device 801, such as a workstation or similar suitable device. In some embodiments, the computing device 801 simply comprises a programmable logic controller.

Items are received at an envelope feed hopper 802. The hopper 802 may be configured to receive any of a variety of different shape and size envelopes. The envelopes may include card carriers having one or more cards, inserts, and the like. In some embodiments, the hopper is configured to receive carriers having previously been separated from envelopes.

Envelopes are passed from the hoper 802 to an envelope opener 804, which opens the envelopes. The opened envelopes are then passed to a contents parser 806. The parser 806 separates the cards and carriers from the envelope and other contents, such as statements, inserts, and the like. Operations taking place at blocks 802, 804, and/or 806 may be assisted with machines such as an OPEX 150/IEM mail opening machine and/or an OPEX 50/51 mail opening machine, although other commercially-available machines may be used.

From the parser 806, the card carriers are passed to a card carrier alignment mechanism 808. The card carrier alignment mechanism 808 is configured to unfold the carrier and align the carrier for further processing. This may include orienting the carrier such that the cards are on top of the carrier, and positioning the carrier with the cards in a specific orientation with respect to the direction of travel of the carrier to additional processing. The carriers are then engaged by a carrier drive mechanism 810 that moves the cards from the alignment mechanism 808 to a separation mechanism 812.

Figure 8B:
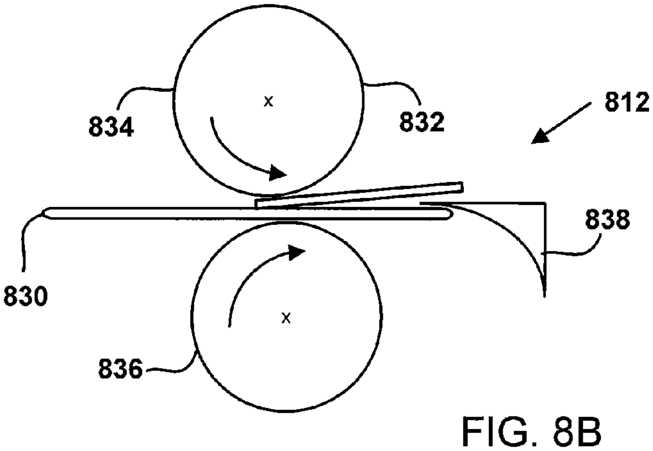
FIG. 8B is a diagram illustrating one embodiment of a card separation mechanism.

The separation mechanism 812 detaches the card from the carrier. As stated previously, cards may be attached by D-holes, glue, slots, and the like. Before further processing can take place, however, the card or cards must be removed from the carrier. FIG. 8B illustrates one embodiment of a card separation mechanism 812 for accomplishing this.

The card separation mechanism 812 of FIG. 8B separates cards 832 from carriers 830. Card carriers 830 with cards 832 attached are moved by top 834 and bottom 836 rollers toward a guide 838. The guide 838 forces the card 832 or cards up and the carrier 830 down. Any of a variety of systems may be used to grab the card 832 and collate it with other cards for further processing. The carrier 830 also may be collated with other carriers for further processing.

The top roller 834, in some embodiments, is horizontally and/or vertically adjustable. This allows the same arrangement to be used for many different types of card/card carrier configurations. The top roller 834 also is spring loaded to allow for varying thicknesses of items being processed. Of course, the bottom roller 836 may be similarly adjustable and spring loaded. An alternative embodiment of a card separation mechanism is illustrated in FIGS. 8C and 8D.

Figures 8C, 8D:
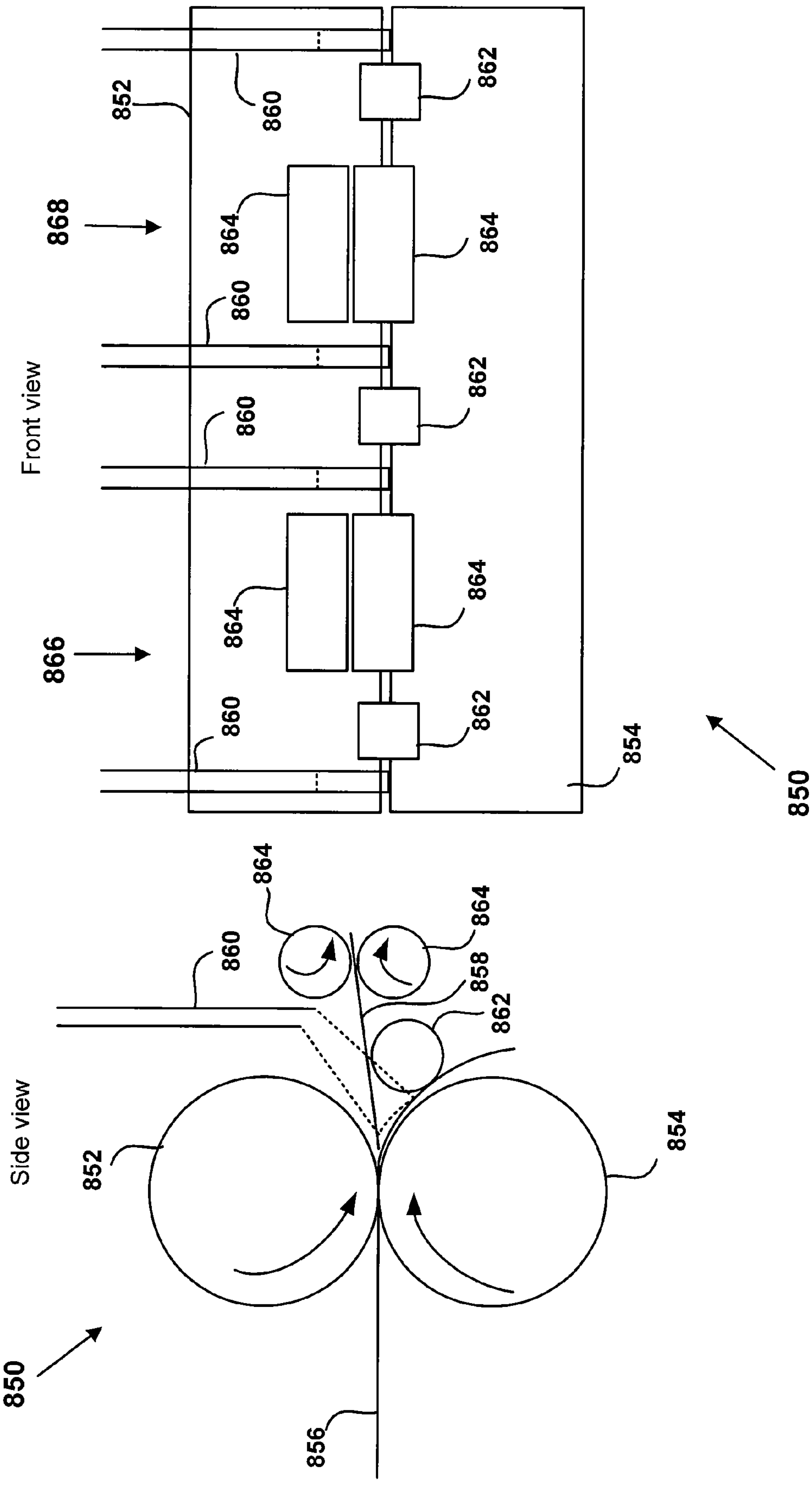
FIG. 8C is a side view of an alternative embodiment of a card separation mechanism.
FIG. 8D is a front view of the alternative embodiment of a card separation mechanism.

FIG. 8C illustrates a side view and FIG. 8D a front view of an alternative card separation mechanism 850. This alternative embodiment includes a pair of rollers, a top roller 852 and a bottom roller 854. The rollers 852, 854, are driven in opposite directions as shown so as to engage a card carrier 856 having one or more cards 858 attached thereto. The rollers advance the carrier and card(s) toward a paper guide 860. The paper guide 860 forces the carrier 856 to travel beneath a paper take away roller 862 while the card(s) 858 travel above the paper take away roller 862 toward a pair of card exit rollers 864. The cards and carriers proceed to respective further processing. Depending on the subsequent processing, the card exit rollers 864 may not be necessary.

As can be appreciated with reference to FIG. 8D, the card separation mechanism may have parallel paths 866, 868 through the mechanism. This arrangement accommodates carriers having cards attached next to each other with respect to the direction of travel. Other embodiments are possible and apparent to those skilled in the art in light of this disclosure.

Returning to FIG. 8A, from the card separation mechanism 812 or 850, card carriers are transported to a paper handling system 814 for further processing. Cards are transported by a card transport mechanism 816 to a card handling system 818. The card transport mechanism 816 could consist of rollers or other gripping mechanisms known in the art.

The card handling mechanism 818 could be a collation device or other card processing device. The card handling mechanism 818 prepares the cards for further processing, which, in some embodiments, comprises destroying the cards. In such cases, the cards may be passed to a card destruction device 820, which may be either of the embodiments described previously with respect to FIGS. 1A through 7 or may be another suitable embodiment. Other examples are possible.

Figure 9:
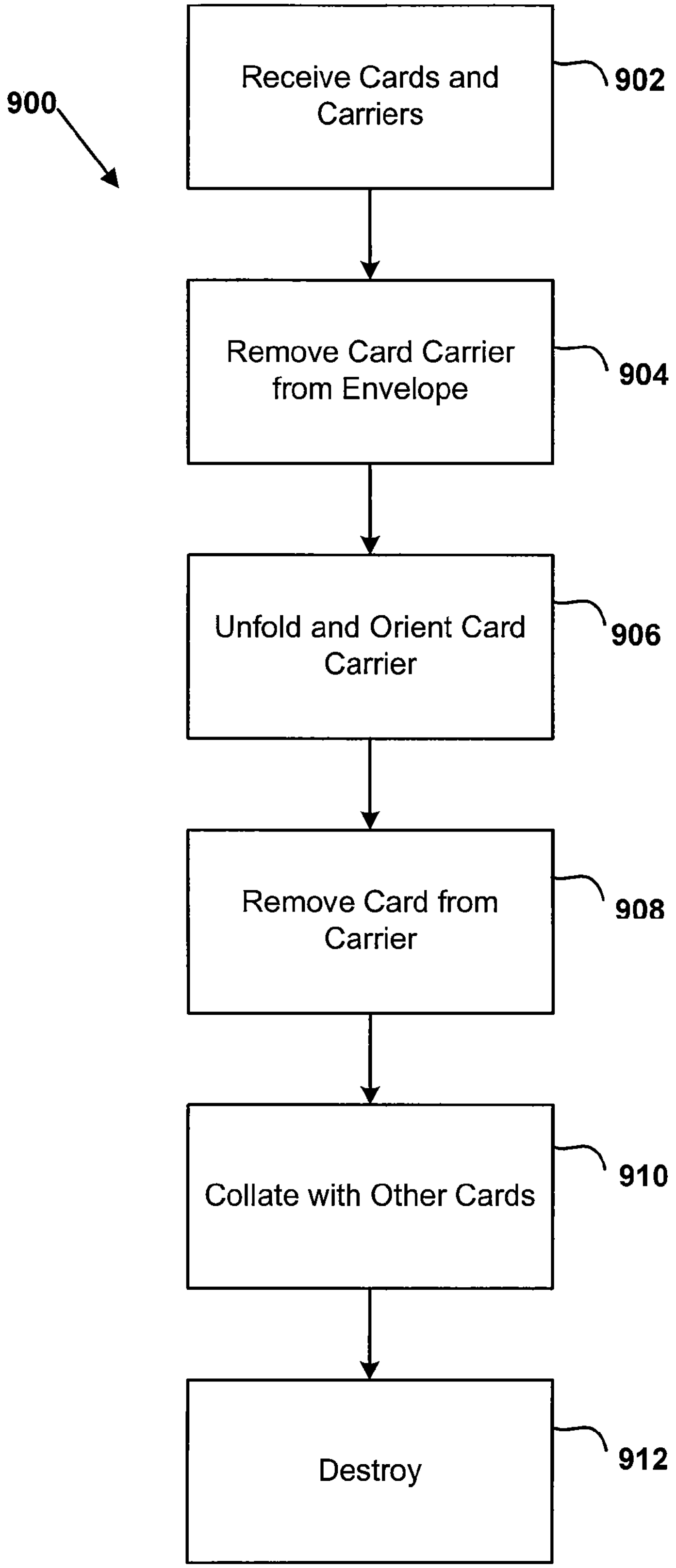
FIG. 9 is a flow diagram illustrating a method of destroying cards according to embodiments of the invention.

Attention is directed to FIG. 9, which illustrates an embodiment of a method 900 of preparing cards for destruction. Other embodiments of such methods may include more, fewer, or different steps than those shown here. At block 902, cards and carriers are received. The cards and carriers may be in envelopes or not. In some embodiments, the envelop feed hopper 802 receives the envelopes containing the cards and carriers.

At block 904, the card carriers having the cards attached are removed from the envelopes. This may involve use of the envelope opener 804. Once removed, the cards carriers are unfolded and oriented at block 906. This may include making sure the card is on top and at the leading edge of the carrier. Orientation may be accomplished using the card carrier alignment mechanism 808.

At block 908, cards are removed from carriers. The card separation mechanism 812 may be used for this operation. Cards then may be collated at block 910 and, in some embodiments, destroyed at block 912. Previously-described devices may be used to accomplish these operations. Those skilled in the art will appreciate many different possibly embodiments in light of this disclosure.

Having described several embodiments, it will be recognized by those of skill in the art that various modifications, alternative constructions, and equivalents may be used without departing from the spirit and scope of the invention. Additionally, a number of well known processes and elements have not been described in order to avoid unnecessarily obscuring the present invention. For example, those skilled in the art know how to manufacture machines described herein. Additionally, those skilled in the art will realize that the present invention is not limited to preparing cards for destruction. Other presentation instruments and the like may be processed according to the teachings herein, and the items processed need not be destroyed. In some embodiments, the items are re-programmed, re-issued, and the like. Accordingly, the above description should not be taken as limiting the scope of the invention, which is defined in the following claims.

What is claimed is:

1. A card separation mechanism comprising:

a receiving arrangement configured to receive a card carrier having a card attached thereto from an upstream process, wherein the upstream process includes an arrangement configured to separate the card carrier from an envelope and orient the carrier for further processing;

a pair of rollers; and a separation guide;

wherein the rollers are configured for rotation in opposite directions, wherein the rollers define a receiving slot configured to receive the card carrier having the card attached thereto from the receiving arrangement, and wherein the rollers are configured to advance the card carrier and card toward the separation guide.

2. The card separation mechanism of claim 1, wherein the separation guide comprises a wedge that is configured to penetrate a space between the card and the carrier and cause the card to move in a direction away from the carrier as the rollers advance the card and carrier toward the separation guide.

3. The card separation mechanism of claim 1, wherein one roller is configured for adjustment with respect to the other roller in at least two directions.

4. The card separation mechanism of claim 1, further comprising a tensioning arrangement configured to allow one roller to move with respect to the other while maintaining generally constant pressure between the two.

5. The card separation mechanism of claim 4, wherein the tensioning arrangement comprises a spring.

6. The system of claim 1, wherein the arrangement configured to separate the card carrier from an envelope and orient the carrier for further processing is further configured to separate the card carrier having a card attached thereto from inserts contained in the envelope.

7. The system of claim 1, wherein the card comprises a selection from the group consisting of credit card, debit card, phone card, smart card, loyalty card, and presentation instrument.

8. The system of claim 1, further comprising an arrangement configured to advance the card to a card destroyer.

* * * * *